United States Patent Office 3,397,231
Patented Aug. 13, 1968

3,397,231
REFINING OF α-6-DEOXY-5-OXYTETRACYCLINE
James J. Korst, Old Lyme, Conn., assignor to Chas. Pfizer & Co., Inc., New York, N.Y., a corporation of Delaware
No Drawing. Filed Apr. 12, 1967, Ser. No. 630,194
9 Claims. (Cl. 260—559)

ABSTRACT OF THE DISCLOSURE

Impure α-6-deoxy-5-oxytetracycline sulfosalicyclic salt is converted to purified hydrochloride salt by recrystalization from methanolic hydrochloric acid followed by conversion of the recrystallized sulfosalicylate to the hydrochloride in ethanolic hydrogen chloride at controlled levels of hydrogen chloride and water.

Background of the invention

The present invention relates to a new and improved process for refining α-6-deoxytetracyclines. More particularly, the process of the present invention is based on the discovery of a novel procedure for converting impure α-6-deoxy-5-oxytetracycline sulfosalicylate to the purified hydrochloride salt in unexpectedly high yield.

U.S. Patent 3,200,149 discloses and claims, inter alia, a novel group of tetracycline antibiotics which are generally designated α-6-deoxytetracyclines. The designations, "6-epi-" and "α-" are used interchangeably therein to refer to identical spatial orientation of the 6-methyl substituent. U.S. Patent 3,165,531 uses the designation "6-epi" in the same sense as used in U.S. Patent 3,200,149 and appropriately uses "6-deoxytetracyclines" when referring to the known prior art isomers. The latter compounds have now been designated to the scientific literature as β-6-deoxytetracyclines and the present disclosure uses the α and β designations in the same sense.

The production of α-6-deoxy-5-oxytetracycline by catalytic hydrogenation of certain 6-methylene-tetracyclines, and also by Raney nickel treatment of various 13-substituted-6-deoxytetracyclines, is known and disclosed in the technical literature, including the aforementioned patents.

These procedures readily provide α-6-deoxy-5-oxytetracycline in good yield. However, the initial reaction products are necessarily contaminated with various reagents or by-product which must be removed before the antibiotics meet pharmaceutical standards of priority. In particular, the reaction crudes may contain various metal contaminants, in elemental or combined form, e.g., nickel, aluminum, or various other catalyst residues. Additionally, there are often degradation products present, such as anhydro- and apo-tetracycline compounds, e.g., 5α,6-anhydro-oxytetracycline and apo-oxytetracycline, and sometimes β-6-deoxy-5-oxytetracycline as well. These too require removal.

α-6-deoxy-5-oxytetracycline is readily recovered from reaction mixtures in the form of its sulfosalicyclate salt, as already described in each of the aforementioned patents. Thus, a solution of the product in a reaction-inert solvent, suitably methanol, is treated with 5-sulfosalicyclic acid, whereupon the solid sulfosalicyclate salt separates and may be collected. This step does not, however, ordinarily eliminate the described impurities, although it may be expected to reduce the concentration of some of them.

Problems are encountered in the further removal of these residual impurities and in the conversion of the sulfosalicylate to the pharmaceutically desirable hydrochloride salt, or to the amphoteric base. Such purifications have been effected in the past, but the methods, such as countercurrent solvent distribution, have been tedious or the yields poor. Thus, the conversion of the impure sulfosalicyclate salt to the amphoteric antibiotic and thence to a highly pure hydrochloride by conventional techniques has typically provided a yield on the order of only about 10%. Conversion to hydrochloride salt in a conventional mixture of ethanol and hydrochloric acid likewise fails to provide an adequate yield of satisfactory product. A practical procedure for conversion of impure sulfosalicylate salt to high purity hydrochloride in high yield has been lacking.

Summary of the invention

The present invention is based on the discovery of a procedure which fulfills this need. Such procedure entails recrystallization of the sulfosalicyclate salt, followed by direct conversion to high purity hydrochloride, without the need for intermediate preparation of the amphoteric antibiotic. More specifically, the present process entails recrystallizing the sulfosalicyclate from methanolic hydrochloric acid, dissolving the recrystallized sulfosalicyclate salt in dry ethanoic hydrogen chloride, adjusting the hydrogen chloride content of the resulting ethanolic solution to at least about 12 moles per mole of the dissolved α-6-deoxy-5-oxytetracycline, and introducing water, up to 11 volume percent, to the dry ethanolic solution. High purity hydrochloride salt thereupon separates from the solution in excellent yield; whatever product remains in the mother liquor is readily recovered for recycle. The α-6-deoxy-5-oxytetracycline hydrochloride produced by the present process is of outstanding quality, and it dissolves readily in water to yield clear solutions, free of the turbidity associated with residual sulfosalicyclate salt.

Detailed description of the invention

In the *first step* of the new process, the impure sulfosalicylate is recrystallized from methanolic hydrochloric acid. This may be effected by dissolving the impure salt in dry methanolic hydrogen chloride and then introducing water and excess sulfosalicyclic acid to the solution, to cause crystallization to take place.

A volume of solvent at least sufficient to dissolve substantially all of the antibiotic will be employed; the volume required varies with the purity of the starting compound. Accordingly, it is best to determine such requirement empirically. Ordinarily, about 4 to about 10 ml. is needed per gram of the impure salt, although volumes as high as 15 ml. per gram may be employed if desired. It will be obvious that use of excessive quantities of solvent is best avoided, to insure high antibiotic recovery.

The hydrogen chloride concentration necessary to effect solution will vary with the purity of the starting salt, the more impure materials being soluble at relatively low hydrogen chloride levels, whereas purer samples require more. Levels of at least about 4% w./v. hydrogen chloride are generally necessary. The upper limit is not critical at all, and levels as high as 20–25% or even higher can be employed, usually, however, with no added advantage. Hydrogen chloride levels of 8–9% w./v. give excellent results in most cases.

It is usually advantageous to employ temperatures above room temperature, and up to the reflux temperature, in order to effect solution with minimum solvent. This is especially desirable where 5a,6-anhydro-oxytetracycline is present as an impurity, in which case reflux for about 30–60 minutes is advisable in order to convert the same to apo-oxytetracycline. This assures most efficient purification, by virtue of the relatively high solubility of apo-oxytetracycline in methanolic hydrochloric acid.

At this point it is prudent, but not absolutely essential, to treat the solution with purifying adsorbent such as activated carbon, for added purification. This is suitably conducted at elevated temperature for efficiency and to insure against premature separation of the antibiotic. Following such treatment, the solution is filtered while still warm, and the filtrate is then ready for introduction of water and excess sulfosalicylic acid. These agents may be added together or separately to the solution, in any order, or the solution may be added to them. There is nothing critical about the order in which the ingredients are combined.

A least about 0.5 mole of sulfosalicylic acid ought to be introduced per mole of the dissolved α-6-deoxy-5-oxytetracycline. Best results are usually achieved with from about 0.9 to about 2.2 moles, although even higher levels can be employed, but without substantial added advantage.

The quantity of water introduced is preferably from about one-quarter to about three-quarter volume per volume of the dry antibiotic solution or filtrate. About a half volume is generally preferred.

The solution is now preferably cooled to room temperature or below, if this has not already been done, desirably with addition of a trace of the desired product to seed the crystallization. As in any crystallization, vigorous agitation is usually beneficial. The product which separates is collected by filtration or other standard means and preferably washed free of mother liquor, e.g., with aqueous methanol. At this stage the antibiotic is usually in the form of crystals containing a mole of sulfosalicylic acid together with 1.5 mole of water and 0.5 mole methanol, per mole of antibiotic. The degree of solvation may, however, differ at times. Further, even if the α-6-deoxy-5-oxytetracycline sulfosalicylate is obtained in amorphous form, it is satisfactory for the next step in the process.

In the *second step* of the new process, the recrystallized sulfosalicylate salt is directly concerted to high purity hydrochloride salt of α-6-deoxy-5-oxytetracycline, without the need for preparation of the amphoteric antibiotic. This is accomplished by dissolving the recrystallized salt in dry ethanolic hydrogen chloride, adjusting the hydrogen chloride content of that solution to at least about 12 moles per mole of the dissolved tetracycline compound, and introducing water into the solution, to cause the hydrochloride salt to separate.

As before, a solvent volume adequate to dissolve substantially all of the sulfosalicylate salt will be selected. In most cases, about 4-6 ml. per gram of the purified salt will fulfill requirements. More can be used, but excessive quantities of solvent reduce the yield of final product and should therefore be avoided.

The hydrogen choride concentration required to effect solution is generally found to be at least about 8% w./v. There is no critical upper concentration limit, and concentrations as high as 33% have been successfully employed.

As in the first step, it is usually preferable to dissolve the tetracycline in the solvent at elevated temperature, up to the reflux temperature, in order to minimize solvent requirements and thereby promote high recovery. A hot filtration of the ethanolic antibiotic solution, preferably after addition of activated carbon adsorbent, is useful in order to eliminate any undissolved or adsorbable impurities, but this is not critical.

The resulting solution or filtrate is now ready for the hydrogen chloride and water adjustments. Such adjustments may be made simultaneously or separately in any order. At least about 12 moles of hydrogen chloride must be present per mole of the tetracycline compound, to insure that the α-6-deoxy-5-oxytetracycline does not crystallize in the form of the sulfosalicylate again. There is no critical upper limit on the hydrogen chloride level, but about 15-20 moles per mole of the tetracycline give excellent results. It will, of course, be appreciated that the hydrogen chloride already present in the solvent introduced to the second step may meet the minimum requirement, in which case it will be unnecessary to introduce further hydrogen chloride at the later stage. The expression "adjusting the hydrogen chloride content," as used herein and in the claims, is intended to include this special situation. More frequently, however, less than 12 moles per mole are initially present and it will be necessary to introduce more at the present stage.

The initial water content of the dry ethanolic solution of recrystallized sulfosalicylate salt is close to zero, the only source of water being the 1.5 moles of water of hydration introduced per mole of the sulfosalicylate salt. Accordingly, it is necessary to introduce additional water to effect the desired separation of product. The water concentration attained should not exceed about 11% by volume, since higher levels may cause the antibotic to crystallize in the form of the sulfosalicylate again. Best results are achieved at a level of at least about 3 volume percent water, and especially in the range of 4-10%.

The hydrogen chloride and water additions discussed above may often be conducted simultaneously, i.e., by addition of aqueous hydrochloric acid of appropriate concentration and volume. It is usually appropriate to employ concentrated hydrochloric acid, from about 0.125 to 0.75 ml. per gram of the recrystallized sulfosalicylate salt introduced to the second step. It will therefore be understood that the expression "introducing water" as employed herein and in the claims in reference to the second step embraces such addition in the form of hydrochloric acid.

The solution may now be cooled to room temperature or below, if desired, preferably with addition of a trace of the desired hydrochloride product to seed the crystallization. Highly pure α-6-deoxy-5-oxytetracycline hydrochloride separates and, when crystallization is complete, the slurry is filtered or subjected to other standard technique to recover the solid product. The latter is then appropriately washed free of mother liquor; e.g., with ethanolic hydrogen chloride, ethanol and acetone; and then dried. The product contains one mole of hydrogen chloride per mole of the antibiotic, usually in combination with a half mole each of water and ethanol, although the degree of solvation with respect to the latter two may sometimes differ. The product obtained is of extremely high quality; it dissolves readily in water to give a clear solution, indicating freedom from the highly insoluble sulfosalicylate salt. If desired, the product may be converted to the free base or amphoteric form by neutralization in reaction-inert solvent according to techniques well known to those skilled in the art.

The new process provides excellent yields, which may be further augmented by recovering and recycling residual antibiotic from the final mother liquor. Addition of sulfosalicylic acid to that liquor will cause separation of residual antibiotic as the sulfosalicylate salt, suitable for recycle in the process. In this manner, the yields obtained closely approach quantitative recovery.

The following examples are illustrative in nature and are not intended to limit the invention, the scope of which is defined in the appended claims.

Example 1.—Recrystallization 7.2 kg. crude α-6-deoxy-5-oxytetracycline sulfosalicylate, recovered from Raney nickel desulfurization of 6-deoxy-13-benzylmercaptooxytetracycline, is dissolved in 12 gallons methanolic hydrogen chloride (prepared by dissolving 14.8 pounds HCl in 20 gallons of methanol). The mixture is heated at reflux temperature and additional methanolic hydrogen chloride is added in two gallon portions as required to effect complete solution. Up to 20 gallons may be required. Activated carbon, ¾ pound, and diatomaceous earth filter aid, 1½ pounds, is added, and after 15 minutes' stirring the mixture is filtered hot and the cake washed with 2 gallons of hot methanolic hydrogen chloride. To the filtrate and wash at 45–50° C. is added a half volume of water containing 2.9 kg. sulfosalicylic acid. After stirring at 50° C. for one hour, the mixture is cooled to 20° C. and granulated for two hours. The resulting crystalline product is filtered and washed with five gallons of a mixture of 2 parts methanol and 1 part water, then with acetone. 6.2 kg. α-6-deoxy-5-oxytetracycline sulfosalicylate, $$E_{1\ cm.}^{1\%} = 217 \text{ at } 349 \text{ m}\mu$$

is obtained. Quantitative chromatography indicates better than 95% purity.

Conversion to hydrochloride salt 6.2 kg. of the recrystallized sulfosalicylate is dissolved in 8.3 gallons of a solution of 16.4 pounds hydrogen chloride in 12 gallons anhydrous ethanol at 50–55° C. 340 grams of activated carbon is added and the mixture is stirred for 15 minutes. It is then filtered hot and the cake washed with about 2.0 gallons ethanolic hydrogen chloride. At 50–55° C. 1580 ml. of 12 N aqueous hydrochloric acid is added. The batch is then seeded and granulated at 50–55° C. for three hours. It is next cooled slowly to 35° C. over a period of 3 hours, then to 20° C., and granulated for an additional four hours. The rather dense crystals are filtered and washed successively with one gallon of cold ethanolic hydrogen chloride, 2 gallons of anhydrous 2B ethanol and finally 2 gallons of acetone. The cake, dried under vacuum at 40° C., consists of 3.44 kg. of α-6-deoxy-5-oxytetracycline hydrochloride.

The mother liquor and wash are combined and an equal volume of water containing 1.6 kg. sulfosalicylic acid is added. The mixture is granulated at 20–25° C. for four hours, filtered, and washed with a mixture of 1 part ethanol and 1 part water, followed finally by acetone. In this way 1.31 kg. of α-6-deoxy-5-oxytetracycline sulfosalicylate is recovered for recycle.

Example 2.—Recrystallization

A mixture of 25.0 g. of crude α-6-deoxy-5-oxytetracycline sulfosalicylate $$(E_{1\ cm.}^{1\%} 150)$$

recovered from a palladium hydrogenation of 11a-chloro-6-deoxy-6-demethyl-6-methylene oxytetracycline, and 100 ml. of a solution of 33 g. hydrogen chloride gas in 400 ml. methanol is heated to reflux on the steam bath. In 10 minutes, the SSA salt dissolves and the solution is refluxed for one hour. The mixture is then treated with activated carbon and filtered through diatomaceous earth filter aid, the pad being washed with 50 ml. of the methanol-HCl solution. The filtrate and washings are combined and warmed to 50° and 10.0 g. of sulfosalicylic acid added, followed by 75 ml. of water. Crystallization begins immediately and the mixture is stirred for two hours at room temperature. After filtration, the crystals are washed well with a methanol-water mixture (33% water), followed by acetone, then ether. There is obtained 16.1 g. (64.4% recovery of α-6-deoxy-5-oxytetracycline sulfosalicylate as pale yellow crystals, $$E_{1\ cm.}^{1\%} 210$$

The mother liquor is shown by papergram to contain considerable β isomer and apo-oxytetracycline.

From an identical experiment, except for the use of 37.5 ml. of water rather than 75 ml., there is obtained 16.3 g. (65.2%) of recrystallized material, $$E_{1\ cm.}^{1\%} 209$$

Conversion to hydrochloride salt 16.0 g. of sulfosalicylate salt, recrystallized as above, $$(E_{1\ cm.}^{1\%} 210)$$

in 72 ml. of a solution of 66 g. HCl gas in 400 ml. ethanol is heated on a hot plate until the salt dissolves. The resulting hazy solution is treated with activated carbon, filtered through diatomaceous earth filter aid and the pad washed with 16 ml. of hot ethanol-HCl solution. The filtrate and washings are combined, heated to 65° on a hot plate, stirred, and 4 ml. of concentrated hydrochloric acid added. The mixture is seeded and allowed to crystallize 4.5 hours at 65–68° with stirring. The mixture is then allowed to cool slowly while crystallization continues for 2 hours. After filtration, the crystals are washed well with ethanol, followed by ether. There is obtained 8.49 g. (73% yield) of α-6-deoxy-5-oxytetracycline hydrochloride $$(E_{1\ cm.}^{1\%} 298)$$

as yellow crystals containing 2% or less β isomer (by papergram estimation). The hydrochloride is totally soluble in water at a concentration of 20 mg./ml.

To the combined mother liquor and washes from the above crystallization is added an equal volume of water followed by 4.0 g. of sulfosalicylic acid. Crystallization begins rapidly and the mixture is stirred overnight, then filtered, and the crystals washed with a 1:1 mixture of ethanol-water, followed by acetone, then ether. There is obtained 2.88 g. (67% of remaining SSA salt, 91% total recovery of crystalline material) of pale yellow crystals consisting mainly of α-6-deoxy-5-oxytetracycline sulfosalicylate with some β and apo impurities present. The mother liquor, greatly enriched in B isomer, is discarded.

Example 3.—Recrystallization 9.2 g. crude α-6-deoxy-5-oxytetracycline sulfosalicylate contaminated with nickel salts is taken up in 64 ml. of hot methanol·HCl (99 g. dry HCl/1200 ml. of methanol). The solution is filtered hot with an additional 10 ml. of hot methanol·HCl for wash. The solution is held at 50° while 7.2 g. of sulfosalicylic acid dihydrate and then 22 ml. of water are added. The mixture is seeded and left to stir overnight at room temperature. The yield of high quality α-6-deoxy-5-oxytetracycline sulfosalicylate is 6.6 g.

Conversion to hydrochloride salt (Method A)

A 14.5 g. sample of recrystallized α-6-deoxy-5-oxytetracycline sulfosalicylate, $$E_{1\ cm.}^{1\%} 215$$

is dissolved with heating in 66 ml. of an ethanol-hydrogen chloride mixture (33 g. HCl gas in 200 ml. of 2B ethanol). The solution is heated to approximately 60°, treated with 0.38 g. of activated charcoal, and filtered through diatomaceous earth filter aid. The pad is washed with 13.5 ml. of hot ethanol-hydrogen chloride solution. The combined filtrate and washings are then heated to 60°, and 4.3 ml. of concentrated hydrochloric acid added. The heat is removed and the mixture seeded and stirred. After 45 minutes, the mixture is warmed on a hot plate to 60°, then allowed to crystallize overnight at room temperature. After filtration, the crystals are washed well with ethanol-hydrogen chloride (33 g. HCl gas in 400 ml. of 2B ethanol), then with ether, and air-dried. There is obtained 7.98 g. (75.7% yield) of α-6-deoxy-5-oxytetracycline hydrochloride, $$E_{1\ cm.}^{1\%} 291$$

Conversion to hydrochloride salt (Method B)

5.0 grams recrystallized α-6-deoxy-5-oxytetracycline sulfosalicylate is dissolved with heating in 23.5 ml. of dry ethanolic hydrogen chloride containing 8 grams hydrogen chloride per 100 ml. Activated carbon is added and the solution is filtered and the cake washed with 5 ml. of the ethanolic hydrogen chloride. To the combined filtrate and wash is added 3.75 ml. concentrated hydrochloric acid and the mixture is cooled with stirring and filtered to recover the hydrochloride product.

What is claimed is:

1. The process for converting sulfosalicylate salt of α-6-deoxy-5-oxytetracycline to the hydrochloride salt, said sulfosalicylate salt containing an impurity selected from metal contaminants and hydro- and apo-tetracycline compounds, said process comprising the steps of:

recrystallizing said sulfosalicylate salt from methanolic hydrochloric acid, dissolving the recrystallized sulfosalicylate salt in dry ethanolic hydrogen chloride, adjusting the hydrogen chloride content of the resulting ethanolic solution to at least about 12 moles per mole of dissolved $\alpha$-6-deoxy-5-oxytetracycline, and introducing water, up to 11 volume percent, to said ethanolic solution, whereby said hydrochloride salt separates from the resulting aqueous ethanolic solution.

2. The process of claim 1 wherein said recrystallizing step is effected by:

dissolving said impure sulfosalicylate salt in dry methanolic hydrogen chloride, and introducing to the resulting methanolic solution about ¼ to ¾ volume water and at least about 0.5 mole sulfosalicylic acid per mole of dissolved $\alpha$-6-deoxy-5-oxytetracycline, whereby recrystallized sulfosalicylate salt separates from said methanolic solution.

3. The process of claim 2 wherein said dry methanolic hydrogen chloride contains at least about 4% w./v. hydrogen chloride.

4. The process of claim 2 wherein up to about 15 ml. of said dry methanolic hydrogen chloride is employed to dissolve each gram of said impure sulfosalicylate salt.

5. The process of claim 2 wherein said resulting methanolic solution is heated at reflux temperature for about 30 to 60 minutes when said impure sulfosalicylate salt contains 5a,6-anhydro-oxytetracycline as an impurity.

6. The process of claim 2 wherein said sulfosalicylic acid introduced to said methanolic solution constitutes from about 0.9 to 2.2 moles per mole of said $\alpha$-6-deoxy-5-oxytetracycline.

7. The process of claim 1 wherein said dry ethanolic hydrogen chloride contains at least about 8% w./v. hydrogen chloride.

8. The process of claim 1 wherein said resulting aqueous ethanolic solution of $\alpha$-6-deoxy-5-oxytetracycline contains at least about 3 volume percent water.

9. The process of claim 1 wherein adjustment of the hydrogen chloride content of said ethanolic solution and introduction of water to said solution are effected simultaneously by adding from about 0.125 to 0.75 ml. concentrated hydrochloric acid to said solution per gram of said $\alpha$-6-deoxy-5-oxytetracycline.

No references cited.

NICHOLAS S. RIZZO, *Primary Examiner.*